3,446,574
PREPARATION OF THE RARE EARTH SESQUICARBONATES
Earl L. Head, Los Alamos, N. Mex., assignor to the United States of America as represented by the United States Atomic Energy Commission
No Drawing. Filed Mar. 8, 1968, Ser. No. 711,527
Int. Cl. C01f *17/00*
U.S. Cl. 23—20                                       2 Claims

ABSTRACT OF THE DISCLOSURE

A method of preparation for the rare earth carbonates in which $CO_2$ gas is introduced into an aqueous solution of the particular rare earth chloride in the presence of aniline.

---

The invention described herein was made in the course of, or under, a contract with the U.S. Atomic Energy Commission.

The carbonates of the rare earths are a unique and versatile class of compounds in that they are converted to the oxides by loss of $CO_2$ on heating, and because of their ready solubility in acid permit the preparation of salts of weak acids at moderate temperatures. Furthermore, the carbonates have found utility in making electroluminescent phosphors.

It is well known in the prior art (U.S. applications S.N. 490,750 now U.S. Patent 3,401,008, "Preparation of the Carbonates of the Rare Earths," Earl L. Head; and S.N. 624,667 now U.S. Patent 3,374,069, "Preparation of Metal Carbonates by $CO_2$-Pressurizing Anhydrous Metal Acetates," Earl L. Head) that the carbonates of the rare earths are produced by the application of $CO_2$ under pressure to an aqueous solution of the hydrated acetate salt and to the anhydrous acetate salt, respectively. In particular, S.N. 624,667 teaches a method of producing the rare earth carbonates with yields of about 80% while the hydrated acetate salt (S.N. 490,750) gave yields of only 50%. The limitation of the prior art was the inability to produce 100% product yields and the necessity of first synthesizing the anhydrous acetates (S.N. 624,667).

The inventor has discovered a method of preparing the rare earth carbonates (of the lanthanide series) in which product yields of approximately 100% theoretical are obtained and using as a starting material the respective chlorides of the rare earths. These chloride salts are commercially available and therefore eliminate a preparation step as was required in the methods of the prior art. The critical feature of this invention is that the pH of the lanthanide-chloride solution must be maintained below 4.7 during the precipitation step. Without maintaining the pH below 4.7 during this reaction step it is impossible to obtain product yields of 100%.

The lanthanide series sesquicarbonates are prepared by the application of $CO_2$ gas at pressures varying from atmospheric to 900 p.s.i.g. to an aqueous solution of the chloride salt in which the molar ratio of aniline to chloride ion concentration, [aniline]/[Cl], is maintained at approximately 2 for a period of about 2–15 hours at temperatures from 25–55° C. (the lower temperatures requiring the longer times). Although carbonate products are obtained in less than 15 hours at 28° C., the longer digestion time produces a more desirable product than in only 2 hours. The same considerations apply to those reactions to which heat is applied, although a period of about 2 hours is generally adequate. To minimize hydrolysis and consequent greater deficiencies of $CO_2$ in the product, for the carbonate reactions involving Er and the heavier elements it is desirable to add the aniline slowly in order to avoid excessive rise of the pH and to carry out the reaction in the region of 25° C. The basicity throughout the series diminishes with increasing atomic weight, or in other words, their affinity for hydroxyl ion increases with increasing atomic weight. As an example, Pr carboante with a $CO_2$ to $Pr_2O_3$ ratio of 3.0 was prepared by first adding the aniline and salt to the water and then introduction of the $CO_2$. But similar treatment with Sm produced a carbonate product with a $CO_2$ to $Sm_2O_3$ ratio of only 2.5. However, by saturating the Sm salt solution with $CO_2$ first and then addition of the aniline slowly enough that the pH never rose above 4.7, a product with a ratio of 2.97 was produced. It is therefore critical to this process that the pH does not rise above 4.7.

It is therefore an object of this invention to provide a method for the preparation of rare earth sesquicarbonates from the corresponding chloride salts.

It is another object of this invention to provide a method of preparing the sesquicarbonates in which yields are obtained which approach 100% of theoretical.

Other objects of this invention will become apparent from the following preferred embodiment.

At a pressure ranging from 200 to 500 p.s.i.g. $CO_2$ gas is introduced into an aqueous solution of the particular rare earth chloride in the presence of aniline. In particular, 3 grams of the chloride salt of the rare earth is added to 50 milliliters of water with the simultaneous addition of 5 milliliters of aniline. This solution is about 0.16 M in salt concentration and 1.1 M in aniline. The resulting mixture is placed in a pressure vessel which is pressured with $CO_2$ gas to 500 p.s.i.g. and heated at a temperature of 50–90° C. for a period of about 2 hours. It is important to introduce slowly the aniline into the reaction system under $CO_2$ pressure and this may be accomplished by placing the aniline in a tapered centrifuge tube which has a small capillary hole in the tip, freezing the aniline using Dry Ice, and then pressurizing the said tube inside the reactor container as stated above. After filtering and without washing, the solid carbonate product is transferred back into the reaction vessel with the addition of 50 milliliters of water and is immediately pressured and heated in a manner similar to the initial reaction with the exception that no additional aniline is added. The reaction is terminated by releasing the pressure and filtering the reaction mixture. After filtering, the carbonate product is removed from the glass frit, washed by stirring in about 150 milliliters acetone for 10 minutes, refiltered, rinsed on the frit with acetone, and air dried for at least four hours.

Another embodiment of this invention as shown in accompanying Table I involves the preparation of Pr and Sm carbonates at atmospheric pressure by simply bubbling $CO_2$ gas through the reaction solution. In the case of Pr the solution containing the dissolved salt is saturated with $CO_2$ by bubbling the gas into the solution. Aniline is then added dropwise in 10- and 20-drop increments over a period of 30 minutes, after which time the run is terminated. Sm is treated in a similar manner except that the aniline is added as a 10% solution in acetone and in a steady drip such that about one-third of the aniline is added in 7½ hours, after which time the run is terminated.

TABLE I.—DATA FOR RARE EARTH CARBONATE PRODUCTS

| Element | Conditions [1] | $CO_2/R_2O_3$ | $H_2O/R_2O_3$ | Total, percent | Yield, percent | Reaction time, hr. |
|---|---|---|---|---|---|---|
| Pr | a | 2.95 | 3.80 | 100 | 97 | 2.5 |
|    | b | 3.06 | 8.31 | 100 | 84 | 40 |
|    | c | 3.03 | 5.92 | 102 | 77 | 0.0 |
| Nd | a | 2.88 | 3.25 | 100 | 100.4 | 1.5 |
| Sm | a | 3.00 | 3.41 | 101 | 100.6 | 1.5 |
|    | c' | 2.56 | 6.06 | 100 | 84 | 0.75 |
|    | c'' | 2.97 | 6.50 | 100 | 54 | 7.5 |
| Gd | a | 3.00 | 3.38 | 101 | 99.9 | 2.5 |
| Er | a | 2.78 | 3.37 | 100 | 98.8 | 2.2 |
|    | d | 2.94 | 3.49 | 101 | 100.1 | 2.5 |
| Lu | a | 2.87 | 6.27 | 101 | 84.4 | 1.75 |
|    | b | 2.90 | 6.46 | 101 | 84 | 0 |
|    | d | 2.85 | 6.07 | 100 | 82.7 | 1.78 |
| Y  | b | 2.84 | 3.26 | 101 | 92 | 16.1 |
|    | d | 2.76 | 3.61 | 100 | 98.6 | 2.0 |
|    | e | 2.93 | 4.06 | 101 | 92.7 | 75.0 |

[1] General conditions of preparation: (a) 50–55° C., 900 p.s.i.g. $CO^2$ pressure; (b) 28° C., 900 p.s.i.g. $CO^2$ pressure; (c) 25° C., 590 torr $CO^2$ pressure, incremental addition of aniline; (c') Same as for c except reactants were mixed prior to introducing $CO^2$ gas; (c'') Same as for c but dropwise addition of aniline reagent (10% aniline in acetone); (d) Frozen aniline technique, 50–55° C., 900 p.s.i.g. $CO^2$ pressure; (e) Same as for d except at 26° C.

The carbonate products obtained using the process of this invention are presented in Tables II and III; the $CO_2$ to $R_2O_3$ and $H_2O$ to $R_2O_3$ values indicate molar ratios of these materials in the product (in a pure sesquicarbonate the theoretical ratio of $CO_2$ to $R_2O_3$ is 3.00) and include the oxygen combustion products evolved from small amounts of aniline contamination. In the tables values in excess of 100% for the Total, percent are an indication of oxygen weight gain due to combustion of organics whereas the value for Yield, percent in excess of 100% are an indication of chloride ion from the carbonate product analysis. Since the combustion sample was generally about 10% of the total carbonate product, this means that a small error in weight due to chloride contamination is then multiplied by 10 fold when the total oxide equivalent of the carbonate product is determined by the percentage factor obtained from the combustion analysis. To minimize the amount of hydroxyl ion in the carbonate product it is important that precipitation of the carbonate occurs in the pH region below about 4.7, particularly in the case of the heavier elements in the lanthanide series. This condition is obtained by adding the aniline after the chloride solution has been exposed to $CO_2$ under pressure. The carbonates do not precipitate below a pH of about 4 so the function of the aniline is that of a base to reduce the hydrogen ion concentration. Since the anilinium ion, $\phi NH_3^+$, is about 50% dissociated at a pH of 4.7, it is desirable to have the amount of aniline present in the ratio of about 2 times that of the chloride ion concentration, which is an indication of the potential HCl concentrations when all of the metal ion has been precipitated as the carbonate. It is observed from Table II in the case of Gd–3 that under these favorable conditions a reaction period of 14½ hours at room temperature produces a 100% yield but the product is slightly deficient in $CO_2$ with a molar ratio of $CO_2$ to $R_2O_3$ of only 2.87. The same situation exists in the case of Nd–3a even after increasing the temperature to about 50° and the pressure to 800 p.s.i.g. However, after removal of the anilinium chloride generated in the first

TABLE II

| Element | Sam. No. | Vol. of aniline added | pH of sol. placed in reactor | 1st period reaction conditions ||| $CO_2/R_2O_3$ | $HO_2/R_2O_3$ | Total, percent | Yield, percent |
| | | | | Time, hrs. | Temp., °C. | Press., p.s.i.g. | | | | |
|---|---|---|---|---|---|---|---|---|---|---|
| Nd | 1 | 8 | 3.66 | 1½ | 70 | 500 | 3.02 | 2.45 | 100.3 | 100.4 |
|    | 2 | 8 | 1.65 | 1 | 100 | 500 | 3.00 | 2.34 | 100.3 | 99.9 |
|    | 3a | 8 | 1.50 | 15 | 52 | 800 | 2.88 | 2.68 | 100.1 | 101.2 |
| Gd | 1 | 8 | 1.61 | 1 | 90 | 500 | 2.99 | 2.81 | 100.3 | 100.5 |
|    | 2 | 5 | 1.50 | 2½ | 55 | 225 | 2.98 | 3.23 | 100.8 | 100.4 |
|    | 3 | 5 | 1.50 | 14½ | 27 | 200 | 2.87 | 3.62 | 100.3 | 100.1 |
| Er | 1a | 8 | 0.96 | 1 | 90 | 500 | 2.91 | 2.51 | 100.1 | 100.8 |
|    | 2 | 4 | 5.3 | 1 | 90 | 500 | | See Table III | | |
|    | 3 | 4 | 5.3 | 1½ | 90 | 200 | | See Table III | | |
|    | 4 | 4 | 5.3 | 3 | 28 | 200 | | See Table III | | |
|    | 5 | 8 | 5.4 | 1½ | 85 | 500 | 2.92 | 2.57 | 100.2 | 100.0 |
| Y  | 1 | 8½ | 0.97 | 1 | 85 | 500 | 2.92 | 2.39 | 100.4 | 99.2 |
|    | 2 | 8 | 0.95 | 17 | 85 | 900 | 2.91 | 2.79 | 100.2 | 100.8 |
|    | 3a | 8 | 0.66 | 1¼ | 80 | 900 | 2.93 | 2.68 | 100.4 | 100.6 |
|    | 4 | 8½ | 0.39 | 1½ | 80 | 900 | 2.90 | 6.46 | 101 | 84 |
| Lu | 1a | 5 | ---- | 5 | 28 | 900 | | See Table III | | |
|    | 2 | 6 | 4.1 | 5 | 28 | 500 | | See Table III | | |
|    | 3 | 6 | 4.1 | 1½ | 80 | 500 | | See Table III | | |
|    | 4 | 4.5 | 4.1 | 1½ | 85 | 500 | | | | |

TABLE III

| Element | Sample No. | 2nd period reaction conditions ||| $CO_2/R_2O_3$ | $H_2O/R_2O_3$ | Total, percent | Yield, percent |
| | | Time, hrs. | Temp., °C. | Press., p.s.i.g. | | | | |
|---|---|---|---|---|---|---|---|---|
| Nd | 3b | 65 | 25 | 450 | 2.98 | 2.57 | 100.0 | ---- |
| Er | 1b | 3¾ | 45 | 500 | 2.98 | 2.57 | 100.3 | ---- |
|    | 2 | 2 | 80 | 500 | 2.96 | 2.36 | 100.5 | 100.7 |
|    | 3 | 2 | 95 | 200 | 2.99 | 2.23 | 100.5 | 99.5 |
|    | 4 | 3¾ | 29 | 200 | 2.96 | 3.36 | 100.6 | 88.1 |
|    | 5 | 1 | 85 | 500 | 2.90 | 2.40 | 100.0 | 99.9 |
| Y  | 3b | 16 | 25 | 700 | 2.95 | 2.77 | 100.3 | ---- |
| Lu | 1b | 65 | 25 | 700 | 2.99 | 5.66 | 100.2 | ---- |
|    | 2 | 15 | 28 | 500 | 2.96 | 6.00 | 100.1 | 89.4 |
|    | 3 | 1½ | 75 | 500 | 2.99 | 5.34 | 100.5 | 98.4 |
|    | 4 | 1 | 80 | 500 | 2.97 | 5.43 | 100.3 | 98.9 | reaction period and also the excess aniline and subsequent treatment of the product under $CO_2$ pressure at room temperature for 65 hours, a pure sesquicarbonate of Nd (Nd–3b) was produced. These and other experiments indicate that at room temperature the aniline contaminant precipitates in such a manner that complete carbonate reaction is prevented, possibly as a surface reaction, but upon its removal the carbonate reaction is permitted to proceed to completion. Similar phenomena are observed in the case of the "heavier" elements Er and Lu (with Y exhibiting properties similar to Er) with additional problems becoming apparent. Not only does the aniline produce similar $CO_2$ deficiencies in the initial reaction but the solid carbonate product obtained possesses the tendency of being soluble in acetone, probably due to an aniline complex, such that reduced yields are obtained in the case of room temperature preparations, e.g., Lu–1a. Again, however, a second reaction period in the absence of aniline produced the product Lu–1b, the virtually pure sesquicarbonate. Extended reaction time alone does not appear to be adequate as indicated by the Y product Y–e shown in Table I.

As shown by the products Er–2 and Er–3 it is found that by increasing the temperature to the region of 90° the reaction time can be reduced to one hour. In all cases this produces better yields with less contamination by aniline and chloride ion. In the case of Y–1 and Y–2 no appreciable effect is observed on extending the reaction time from 1 to 17 hours at 85° C. Although 100% yields can be obtained in 1 hour at 90 at 200 p.s.i.g., it is necessary to submit the product to a second reaction process in order to improve the quality of the product with regard to improving the $CO_2$ content and diminishing the aniline and chloride contamination. After the initial reaction period at the higher temperature the carbonate products of the lighter elements contain less chloride contamination than those of the heavier elements which may contain as much as 1 weight percent chloride ion (based upon the oxide resulting from combustion analysis). The second reaction period tends to reduce this to about 0.2% or less. Since the longer second reaction time of 65 hours at 25° C. reduced the aniline and chloride ion to essentially zero in the case of Nd–3b and Lu–1b and the shorter reaction period of 2 hours at 80° C. in the case of Er–2 had no appreciable effect, it is possible that a diffusion process which is both time and temperature dependent is involved in the production of a pure sesquicarbonate as might be indicated in the case of Er–1b.

As shown in the case of the Y products, reducing the pH by addition of conc. HCl down to as low as 0.4 had no noticeable effect on the reaction. $CO_2$ pressures much in excess of 200 p.s.i.g. do not appear to have any appreciable effect on the production and recovery of the carbonates. However, when products which have been washed free of aniline are replaced in water and submitted to the conditions of a second reaction period, losses of 3–4% may occur due to dissolution in the carbonic acid solution generated by the $CO_2$. Under these conditions a little aniline may be added to avoid this loss with no undesirable consequences. Generally, sufficient residual aniline is retained by the product that additional aniline is not required. The concentration of chloride salt was doubled to produce a concentration of about 0.3 M in the case of Er–5. Although there is no indication of aniline contamination, the chloride content is about 1% even after the second reaction period. This could probably be removed by a longer second reaction period.

While particular embodiments of my invention have been described, it will be apparent to those skilled in the art that changes and modifications may be made without departing from the invention in its broader aspects and I aim therefore in the appended claims to cover all such changes and modifications as fall within the true spirit and scope of this invention.

In particular, techniques have been described whereby sesquicarbonate products of all the rare earth elements can be prepared in yields of 99–100% by the application of $CO_2$ gas to aqueous solutions of the chloride salts in which an organic base such as aniline is present to neutralize the acid which is generated as a consequence of the precipitation of the metal carbonate. This essentially eliminates the problem of double salt formation which is encountered when the alkali carbonates are used. The particular conditions to be used in obtaining a carbonate product are dependent upon the desired quality of the product. Generally, the best product is obtained by carrying out the reaction in 2 steps: (1) the initial preparation of the carbonate and subsequent filtration to remove the large excess of aniline and anilinium chloride, and (2) the second period of reaction in which the production of the sesquicarbonate is completed. The two-stage reaction process may be effectively carried out with the following conditions being maintained during both stages: 200 to 500 p.s.i.g. $CO_2$ pressure, 50–90° C., and a reaction time of 1½ to 2 hours.

Although aniline is introduced into the pressure reactor in a frozen condition, this is done only as a method for introducing the aniline after the reactor is closed and pressured with $CO_2$ gas. A more desirable method is to introduce the aniline slowly in a dilute form so as to approach the condition of homogeneous precipitation. Of course, any organic base may be substituted for the aniline since it functions only to adjust and maintain the range of pH of the solution during the precipitation stage of the reaction as stated heretofore.

Although this method was found to work with the nitrates, perchlorates and acetates, because of the attending problems of contamination, added cost of the reagents, the instability of the nitrates and perchlorates in the presence of organics, and the highly hygroscopic nature of the perchlorates, this work was restricted to the chlorides.

What is claimed is:
1. A process for preparing the sesquicarbonates of the lanthanide series metals in yields of approximately 100% of theoretical which comprises forming an aqueous solution of the chloride of the lanthanide metal in a reaction vessel, adding aniline to said solution in an amount to maintain the pH of the solution in the range 0.4 to 4.7 throughout the process, maintaining the temperature of the resulting solution in the range 25° to 90° C., introducing $CO_2$ gas at pressures ranging from atmospheric to 900 p.s.i.g. into the solution for a time sufficient to precipitate the said lanthanide series metal carbonate and recovering said carbonate.

2. The method of claim 1 in which the carbonate product obtained is transferred back into the reaction vessel with the addition of water, pressured with $CO_2$ gas to about 200 p.s.i.g., heated to a temperature of about 55° C., for a period of about 2 hours.

References Cited
UNITED STATES PATENTS

| | | | |
|---|---|---|---|
| 3,092,449 | 6/1963 | Brilet | 23—22 |
| 3,153,571 | 10/1964 | Bronaugh | 23—61 X |
| 3,374,069 | 3/1968 | Head | 23—23 X |
| 3,401,008 | 10/1968 | Head | 23—23 |

HERBERT T. CARTER, *Primary Examiner.*

U.S. Cl. X.R.

23—22, 23, 24, 61